(12) United States Patent
Balan et al.

(10) Patent No.: US 10,539,242 B2
(45) Date of Patent: Jan. 21, 2020

(54) TRUNNION BALL VALVE WITH INTERCHANGEABLE AND REPLACEABLE SEAT INSERT

(71) Applicant: Cameron International Corporation, Houston, TX (US)

(72) Inventors: Mircea Balan, Moore, OK (US); Steven Burrows, Oklahoma City, OK (US)

(73) Assignee: Cameron International Corporation, Houston, TX (US)

( * ) Notice: Subject to any disclaimer, the term of this patent is extended or adjusted under 35 U.S.C. 154(b) by 0 days.

(21) Appl. No.: 15/584,007

(22) Filed: May 1, 2017

(65) Prior Publication Data

US 2017/0328481 A1    Nov. 16, 2017

Related U.S. Application Data

(63) Continuation of application No. 12/983,800, filed on Jan. 3, 2011, now Pat. No. 9,657,848.

(51) Int. Cl.
*F16K 5/06* (2006.01)
*F16K 31/60* (2006.01)

(52) U.S. Cl.
CPC .......... *F16K 5/0673* (2013.01); *F16K 5/0678* (2013.01); *F16K 5/0689* (2013.01); *F16K 31/602* (2013.01); *Y10T 29/49412* (2015.01)

(58) Field of Classification Search
CPC .... F16K 5/0678; F16K 5/0689; F16K 5/0673; F16K 31/602; F16K 5/06; F16K 5/0642; Y10T 29/49412

(Continued)

(56) References Cited

U.S. PATENT DOCUMENTS

| 271,073 A | * | 1/1883 | Jenkins | ................... F16K 1/42 251/333 |
| 2,263,454 A | | 11/1941 | Clade | |

(Continued)

FOREIGN PATENT DOCUMENTS

| DE | 2312839 A1 | 9/1974 |
| DE | 19520900 | 12/1996 |

(Continued)

OTHER PUBLICATIONS

Canadian Office Action for CA Application No. 2,823,239 dated Feb. 8, 2018; 5 pgs.

(Continued)

*Primary Examiner* — Marina A Tietjen
(74) *Attorney, Agent, or Firm* — Fletcher Yoder, P.C.

(57) ABSTRACT

The disclosed embodiments include systems and methods for retaining a seat insert of a ball valve in place within a seat ring of the ball valve. In particular, the seat insert is an annular ring having a tapered section on an outer wall of the annular ring. The tapered section of the seat insert is configured to mate with a shoulder in an outer surface of a profiled groove of the seat ring. The seat insert snaps into the profiled groove with the shoulder, thereby preventing axial movement of the seat insert with respect to the profiled groove of the seat ring. In addition, a locking ring also fits within the profiled groove of the seat ring to prevent axial and radial movement of the seat insert with respect to the profiled groove of the seat ring. More specifically, once the seat insert has been snapped into place within the profiled groove of the seat ring, the locking ring is also inserted into the profiled groove of the seat ring.

20 Claims, 8 Drawing Sheets

(58) Field of Classification Search
USPC .................................. 251/316, 360, 362, 361
See application file for complete search history.

(56) References Cited

U.S. PATENT DOCUMENTS

| | | | |
|---|---|---|---|
| 3,027,909 A * | 4/1962 | Swain | F16K 1/12 |
| | | | 137/219 |
| 3,146,988 A | 9/1964 | Riopelle et al. | |
| 3,211,421 A * | 10/1965 | Johnson, Jr. | F16K 5/0678 |
| | | | 251/315.05 |
| 3,226,080 A | 12/1965 | Lowrey | |
| 3,269,692 A | 8/1966 | Shafer | |
| 3,445,087 A | 5/1969 | Priese et al. | |
| 3,480,253 A | 11/1969 | Priese et al. | |
| 3,497,176 A | 2/1970 | Priese | |
| 3,497,178 A | 2/1970 | Priese | |
| 3,521,855 A | 7/1970 | Jensen | |
| 3,741,523 A | 6/1973 | Scaramucci et al. | |
| 3,778,029 A | 12/1973 | Baker | |
| 3,901,517 A | 8/1975 | Heathcott | |
| 4,061,307 A | 12/1977 | Yoshiike et al. | |
| 4,071,220 A | 1/1978 | Iino | |
| 4,111,393 A | 9/1978 | McClurg et al. | |
| 4,135,545 A | 1/1979 | Fowler et al. | |
| 4,157,170 A | 6/1979 | McClurg | |
| 4,236,691 A | 12/1980 | Wright | |
| 4,258,901 A | 3/1981 | Zinnai et al. | |
| 4,272,054 A | 6/1981 | Zinni | |
| 4,304,392 A | 12/1981 | Maciulaitis | |
| 4,327,895 A | 5/1982 | Blumenkranz et al. | |
| 4,386,756 A | 6/1983 | Muchow | |
| 4,428,561 A | 1/1984 | Thompson | |
| 4,477,055 A | 10/1984 | Partridge | |
| 4,483,511 A | 11/1984 | Kushida et al. | |
| 4,519,412 A | 5/1985 | Grazioli | |
| 4,552,335 A | 11/1985 | Alexander et al. | |
| 4,566,482 A | 1/1986 | Stunkard | |
| 4,606,368 A | 8/1986 | McCafferty | |
| 4,658,847 A | 4/1987 | McCrone | |
| 4,706,970 A | 11/1987 | Ramirez | |
| 4,844,410 A * | 7/1989 | Eminger | F16K 5/0673 |
| | | | 137/315.18 |
| 4,911,408 A | 3/1990 | Kemp | |
| 4,911,413 A | 3/1990 | Baba et al. | |
| 4,940,208 A | 7/1990 | Kemp | |
| 5,088,687 A | 2/1992 | Stender | |
| 5,137,259 A | 8/1992 | Stein | |
| 5,163,692 A | 11/1992 | Schofield et al. | |
| 5,267,722 A | 12/1993 | Coulter | |
| 5,419,532 A * | 5/1995 | Fan | F16K 5/0673 |
| | | | 251/315.08 |
| 6,202,981 B1 | 3/2001 | Davis et al. | |
| 6,345,805 B1 | 2/2002 | Chatufale | |
| 2004/0200988 A1 | 10/2004 | Lorenz | |
| 2004/0256591 A1 | 12/2004 | Latzer | |
| 2012/0167987 A1 | 7/2012 | Balan et al. | |

FOREIGN PATENT DOCUMENTS

| | | | |
|---|---|---|---|
| DE | 19712581 | 10/1998 | |
| DE | 10022909 | 11/2001 | |
| EP | 0047147 | 3/1982 | |
| EP | 0053983 A1 * | 6/1982 | ............ E21B 34/12 |
| EP | 0120556 A1 | 10/1984 | |
| FR | 1261953 | 5/1961 | |
| GB | 2105010 | 3/1983 | |
| GB | 2140534 A | 11/1984 | |
| JP | 2007232019 | 9/2007 | |

OTHER PUBLICATIONS

International Search Report and Written Opinion dated Mar. 6, 2012 in PCT Application No. PCT/US11/065667.
International Search Report and Written Opinion dated Mar. 6, 2012 in PCT Application No. PCT/US11/065663.
European EP Search Report (Article 94(3) EPC) for EP Application No. 11 804 892.5 dated Dec. 10, 2018; 7 pgs.

* cited by examiner

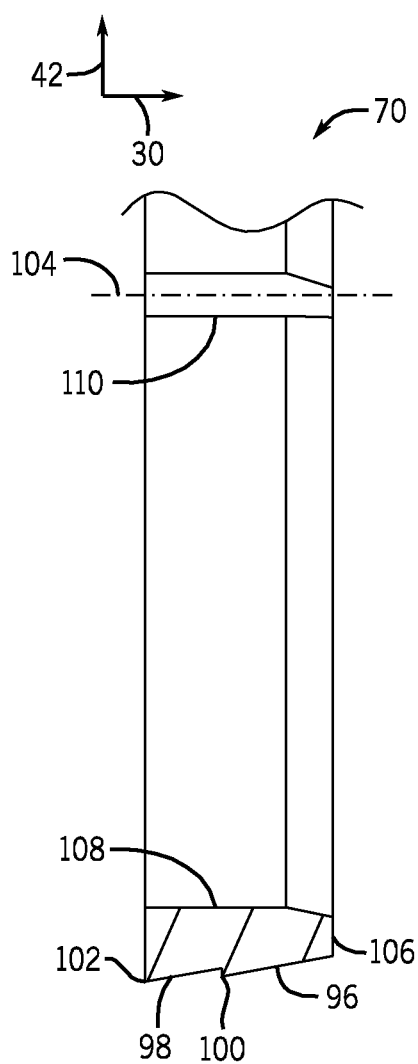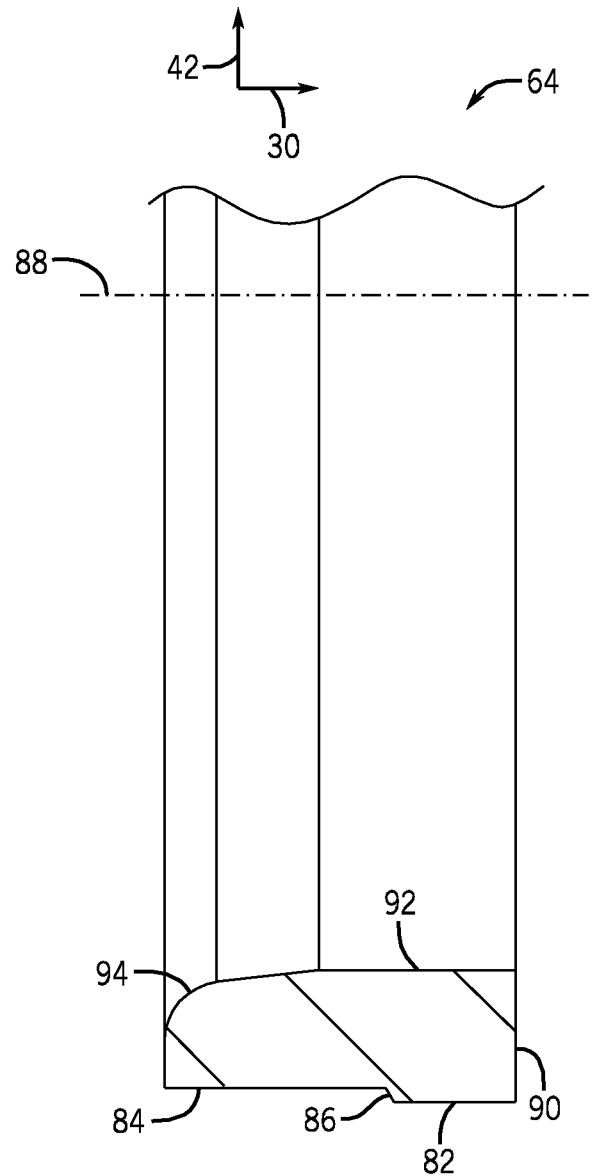
FIG. 5
FIG. 6

TRUNNION BALL VALVE WITH INTERCHANGEABLE AND REPLACEABLE SEAT INSERT

CROSS-REFERENCE TO RELATED APPLICATION

This application is a continuation of U.S. patent application Ser. No. 12/983,800, entitled "Trunnion Ball Valve with Interchangeable and Replaceable Seat Insert," filed Jan. 3, 2011, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Ball valves may be employed to open or close to enable or block a flow of fluid in a variety of applications. Ball valves typically include a body, an adapter, a rotatable ball disposed within the body and adapter, and a stem coupled to the ball. Trunnion type ball valves often use seats with plastic inserts that physically contact the ball of the ball valve. To retain the plastic insert in a metallic seat ring, a lip portion of the metallic seat ring is often deformed (i.e., rolled) such that the lip of the metallic seat ring holds the plastic insert in place. Therefore, when the plastic insert needs to be changed, the process involves unrolling the lip of the metallic seat ring, often resulting in the loss of the seat ring.

SUMMARY OF THE INVENTION

The disclosed embodiments include systems and methods for retaining a plastic seat insert of a ball valve in place within a metallic seat ring without rolling or unrolling a lip of the metallic seat ring. In particular, in certain embodiments, the seat insert is an annular ring having a tapered section on an outer wall of the seat insert. The tapered section of the seat insert is configured to mate with a shoulder in an outer surface of a profiled groove of the seat ring. The seat insert snaps into the profiled groove with the shoulder preventing axial movement of the seat insert with respect to the profiled groove of the seat ring. In addition, in certain embodiments, an annular locking ring also fits within the profiled groove of the seat ring to prevent axial and radial movement of the seat insert with respect to the profiled groove of the seat ring. More specifically, once the seat insert has been snapped into place within the profiled groove of the seat ring, the locking ring is also inserted into the profiled groove of the seat ring. In certain embodiments, the locking ring includes one or more tapered outer walls that act as teeth against inner walls of the seat insert, thereby preventing axial movement of the locking ring with respect to the seat insert. As such, the locking ring is held in place within the profiled groove of the seat ring, thereby preventing axial and radial movement of the seat insert with respect to the profiled groove of the seat ring. In other embodiments, the locking ring is a round ring configured to snap into a semi-circular groove in an inner surface of the profiled groove of the seat ring.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 5 is a partial cross sectional side view of the locking ring of FIG. 3;

FIG. 6 is a partial cross sectional side view of the seat insert of FIG. 3;

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The disclosed embodiments include systems and methods for retaining a plastic seat insert of a ball valve in place within a metallic seat ring without rolling or unrolling a lip of the metallic seat ring. In particular, in certain embodiments, the seat insert is an annular ring having a tapered section on an outer wall of the seat insert. The tapered section of the seat insert is configured to mate with a shoulder in an outer surface of a profiled groove of the seat ring. The seat insert snaps into the profiled groove with the shoulder preventing axial movement of the seat insert with respect to the profiled groove of the seat ring. In addition, in certain embodiments, an annular locking ring also fits within the profiled groove of the seat ring to prevent axial and radial movement of the seat insert with respect to the profiled groove of the seat ring. More specifically, once the seat insert has been snapped into place within the profiled groove of the seat ring, the locking ring is also inserted into the profiled groove of the seat ring. In certain embodiments, the locking ring includes one or more tapered outer walls that act as teeth against inner walls of the seat insert, thereby preventing axial movement of the locking ring with respect to the seat insert. As such, the locking ring is held in place within the profiled groove of the seat ring, thereby preventing axial and radial movement of the seat insert with respect to the profiled groove of the seat ring. In other embodiments, the locking ring is a round ring configured to snap into a semi-circular groove in an inner surface of the profiled groove of the seat ring.

Figure 1:
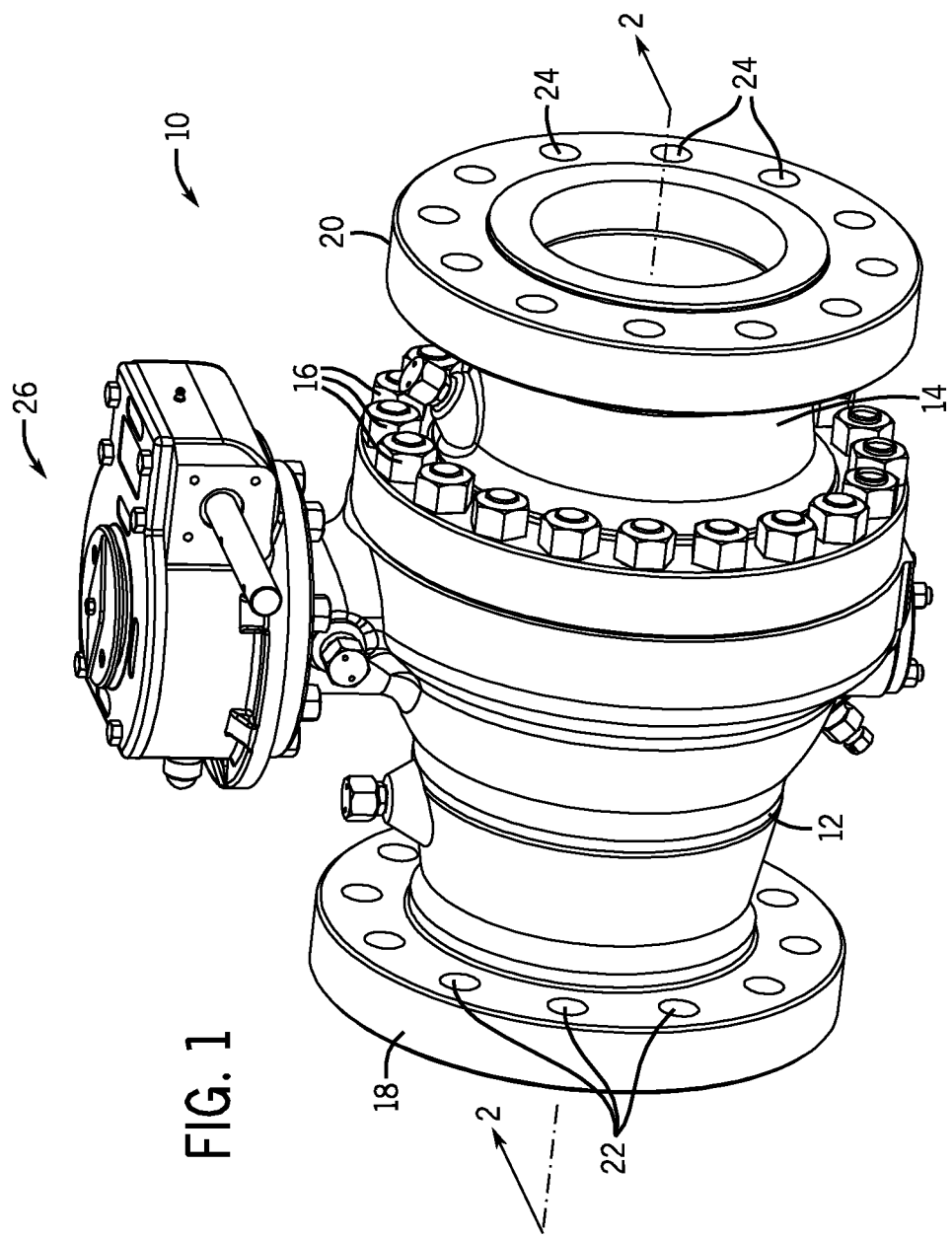
FIG. 1 is a perspective view of a ball valve configured to enable or block a flow of fluid.

Turning now to the figures, FIG. 1 is a perspective view of a ball valve 10 configured to enable or block a flow of fluid. As illustrated, the ball valve 10 includes an annular body 12 and an annular adapter 14. The body 12 and the adapter 14 of the ball valve 10 are configured to mate with each other such that a seal is created between the body 12 and the adapter 14. In particular, in certain embodiments, the adapter 14 is configured to be coupled to the body 12 via a plurality of fasteners 16. In an alternative embodiment, the adapter 14 may be secured to the body 12 by a welded connection. In such an embodiment, the fasteners 16 may be omitted. The body 12 and the adapter 14 also include a body flange 18 and an adapter flange 20, respectively. The flanges 18, 20 are configured to seal and secure the ball valve 10 to other fluid conduits. As will be appreciated, fasteners may pass through openings 22, 24 in the flanges 18, 20, respectively, and corresponding openings within respective conduits to secure the body 12 and the adapter 14 to the conduits.

As described in greater detail below, the ball valve 10 includes a ball configured to rotate from an open position to a closed position. The ball includes a bore that facilitates the passage of fluid through the ball valve 10. In the open position, the bore of the ball is aligned with bores of the body 12 and the adapter 14, such that fluid may pass through the ball valve 10. In the closed position, the bore is rotated perpendicular to the body 12 and the adapter 14, thereby substantially blocking the passage of fluid through the ball valve 10. As will be appreciated, rotating the ball to an orientation between the open and closed positions may enable or block a flow of fluid through the ball valve 10 by adjusting the fluid passage area. As described in greater detail below, the ball is rotationally coupled to a stem such that rotation of the stem causes the ball to rotate. Furthermore, the stem may be coupled to an actuator 26 configured to mount with a variety of valve control components. For example, the actuator 26 may be an electric or hydraulic actuator configured to control the position of the ball within the ball valve 10. Alternatively, the stem may be coupled to a handle such that the ball valve 10 may be operated manually.

Figure 2:
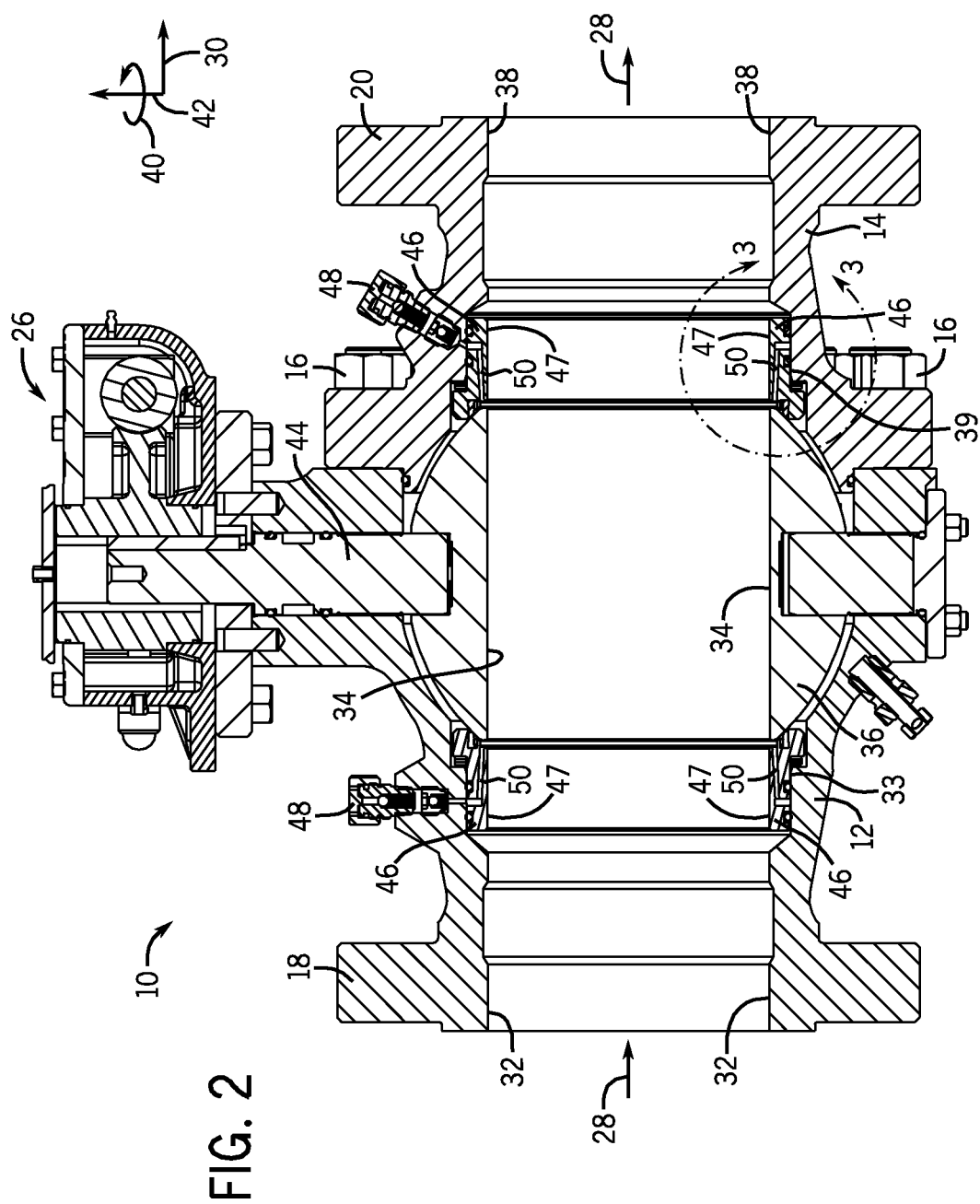
FIG. 2 is a cross sectional side view of the ball valve of FIG. 1.

FIG. 2 is a cross sectional side view of the ball valve 10 of FIG. 1. As illustrated, the ball valve 10 is in the open position, thereby facilitating a flow of fluid 28 in an axial direction 30. Specifically, the fluid enters a bore 32 of the body 12, flows through a bore 34 of a ball 36, and exits a bore 38 of the adapter 14. As illustrated, the ball 36 is configured to fit between the body 12 and the adapter 14. As described above and illustrated by arrow 40, the ball 36 may rotate about a radial axis 42 to enable or block the flow of fluid 28 through the ball valve 10. Rotation of the ball 36 varies the flow area between the bores 32, 38 of the body 12 and the adapter 14 and the bore 34 of the ball 36, thereby adjusting the flow rate of fluid 28. In other words, rotation of the ball 36 may enable or block the flow of the fluid 28 through the body 12 and the adapter 14 of the ball valve 10. To facilitate rotation of the ball 36, a stem 44 is rotationally coupled to the ball 36. In general, the fluid 28 may enter through either the body 12 or the adapter 14 and exit through the other. For example, in the illustrated embodiment, the fluid 28 enters through the body 12, and exits through the adapter 14. However, in other embodiments, the fluid 28 may enter through the adapter 14 and exit through the body 12.

As illustrated in FIG. 2, the ball valve 10 also includes two annular seat rings 46, with each seat ring 46 disposed on either side of the ball 36. More specifically, one seat ring 46 is disposed between the ball 36 and the body 12 and the other seat ring 46 is disposed between the ball 36 and the adapter 14. Each seat ring 46 comprises an annular body that fits within a respective bore 33, 39 of the body 12 or adapter 14 and abuts the ball 36 when the body 12, the seat rings 46, the ball 36, and the adapter 14 are assembled together. For example, the bore 33 of the body 12 is a bore axially adjacent the bore 32 of the body 12 described above, and the bore 39 of the adapter 14 is a bore axially adjacent to the bore 38 of the adapter 14 described above. In general, the bore 33 of the body 12 has a larger diameter than the bore 32 of the body 12, and the bore 39 of the adapter 14 has a larger diameter than the bore 38 of the adapter 14, such that the seat rings 46 fit within the bores 33, 39 when the body 12, the seat rings 46, the ball 36, and the adapter 14 are assembled together. Furthermore, in certain embodiments, the bore 32 of the body 12, annular inner walls 47 of the seats rings 46, the bore 34 of the ball 36, and the bore 38 of the adapter 14 are all generally concentric having substantially similar inner diameters when the body 12, the seat rings 46, the ball 36, and the adapter 14 are assembled together.

When the ball valve 10 is assembled, the seat rings 46 create a seal between the ball 36 and the body 12 and between the ball 36 and the adapter 14. In addition, in certain embodiments, the ball valve 10 includes a plurality of injection ports 48 that are configured to align with and enable fluid communication with injection channels 50 in the seat rings 46. The injection ports 48 and injection channels 50 facilitate the delivery of lubricating or sealant fluids to the interfaces between the seat rings 46 and the ball 36. The lubricating fluids counteract the frictional forces generated between the ball 36 and the seat rings 46 when the ball 36 is rotated between open and closed positions.

Figure 3:
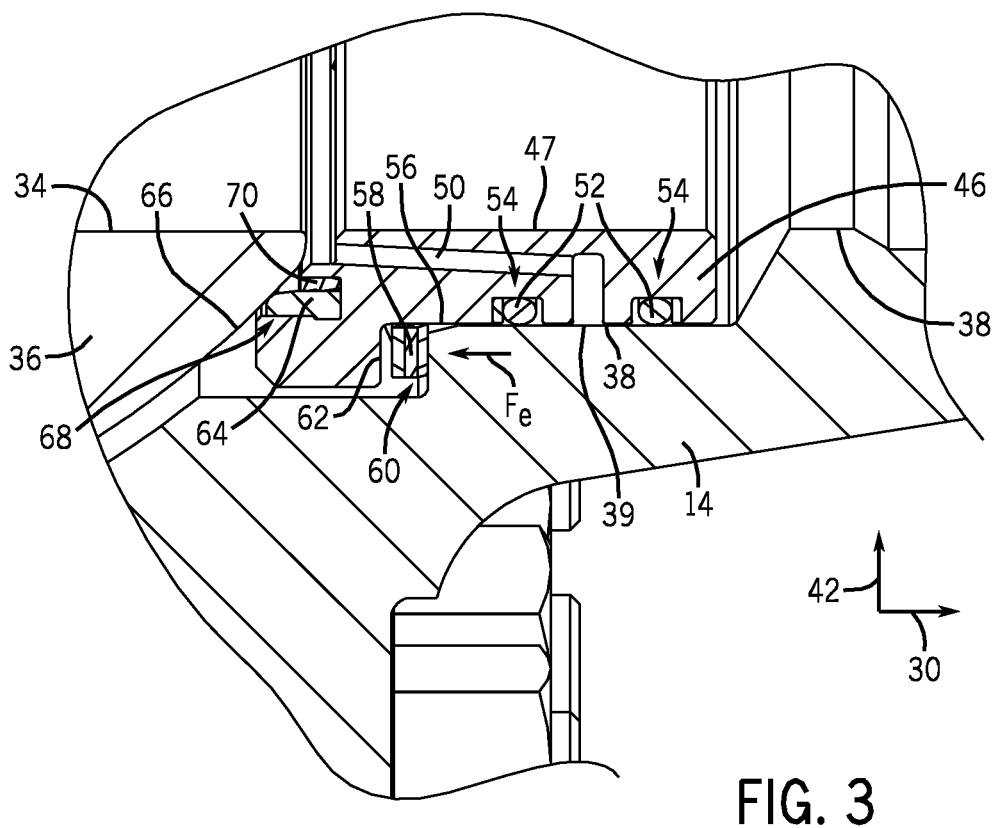
FIG. 3 is a partial cross sectional side view of an exemplary embodiment of the ball, the seat ring, and the adapter of FIG. 2.

FIG. 3 is a partial cross sectional side view of an exemplary embodiment of the ball 36, the seat ring 46, and the adapter 14 of FIG. 2. Although FIG. 3 illustrates the manner in which the ball 36, the seat ring 46, and the adapter 14 interact, the interaction between the other seat ring 46, the ball 36, and the body 12 are substantially similar on the opposite side of the ball 36. As illustrated, each seat ring 46 may be associated with ring seals 52 that are held in position between the seat ring 46 and the bores 33, 39 (e.g., the adapter bore 39 as illustrated in FIG. 3) within grooves 54 on an outer annular wall 56 of the seat ring 46. The ring seals 52 provide sealing of the seat ring 46 to the body 12 or adapter 14.

As illustrated in FIG. 3, each seat ring 46 is also associated with an energizing device 58 that provides an energizing force $F_e$ in the axial direction 30. More specifically, the energizing force $F_e$ biases the seat ring 46 against the ball 36 when the ball 36, the seat rings 46, the body 12, and the adapter 14 are assembled together. As illustrated, in certain embodiments, the energizing device 58 may be located in the space 60 defined between the outer annular wall 56 of the seat ring 46, the bore 33, 39 of the body 12 or adapter 14 (e.g., the adapter bore 39 as illustrated in FIG. 3), and a radial surface 62 that extends from the outer annular wall 56 of the seat ring 46. In certain embodiments, the energizing device 58 may be a spring configured to generate the energizing force $F_e$ when the seat ring 46 moves axially against the energizing device 58. However, in other embodiments, the energizing device 58 may be any device suitable for providing the energizing force $F_e$.

As described above, the energizing force $F_e$ biases the seat ring 46 against the ball 36 when the ball 36, the seat rings 46, the body 12, and the adapter 14 are assembled together. However, the body of the seat ring 46 does not actually physically contact the ball 36. Rather, an annular seat insert 64 is used to physically contact a surface 66 of the ball 36. More specifically, as described in greater detail below, the seat insert 64 is an annular ring that may be snapped into an annular profiled groove 68 in the annular seat ring 46. As illustrated, the profiled groove 68 includes a contoured profile that extends around the annular seat ring 46. In certain embodiments, the seat ring 46 may generally be made from a metallic material, while the seat insert 64 may be made from a plastic material such that the physical contact between the ball 36 and the seat insert 64 slightly compresses the seat insert 64. Using a plastic seat insert 64 eliminates the metal-on-metal contact that would otherwise exist between the ball 36 and the seat insert 64, and provides elastic sealing properties.

As described in greater detail below, the seat insert 64 is held in place within the profiled groove 68 by an annular locking ring 70 that also fits within the profiled groove 68. In certain embodiments, the locking ring 70 may be made from a metallic material and, as described in greater detail below, may include a plurality of tapered surfaces that help retain the locking ring 70 and the seat insert 64 in the profiled groove 68. When the locking ring 70 and the seat insert 64 are both inserted into the profiled groove 68, the locking ring 70 prevents the seat insert 64 from substantially moving in either the axial direction 30 or the radial direction 42. However, when a new seat insert 64 is needed (e.g., when the seat insert 64 becomes slightly worn with age), the plastic seat insert 64 may simply be machined out, the locking ring 70 may be removed from the profiled groove 68, a new plastic insert 64 may be inserted into the profiled groove 68, and the locking ring 70 may be re-inserted into the profiled groove 68, thereby holding the new plastic insert 64 in place. In other words, instead of replacing the entire seat ring 46 due to wear that occurs between the ball 36 and the seat ring 46, the present embodiments enable replacement of only the plastic seat insert 64.

Figure 4:
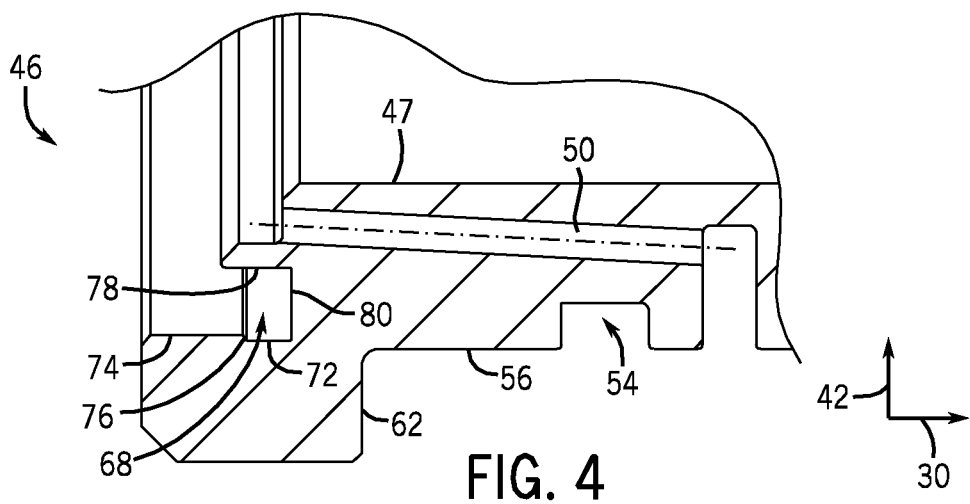
FIG. 4 is a partial cross sectional side view of the seat ring of FIG. 3.

FIG. 4 is a partial cross sectional side view of the seat ring 46 of FIG. 3. As illustrated, the seat ring 46 includes the profiled groove 68 that has a plurality of surfaces that help retain the seat insert 64 and the locking ring 70 in place. In particular, the profiled groove 68 includes an annular first outer surface 72 and an annular second outer surface 74 connected by an annular insert shoulder 76. More specifically, the first outer surface 72 has a first diameter (e.g., as measured from the center of the annular seat ring 46) that is slightly larger than a second diameter of the second outer surface 74. As such, the insert shoulder 76 is configured to hold the seat insert 64 within the profiled groove 68 when the seat insert 64 and the locking ring 70 are installed within the profiled groove 68. More specifically, as described in greater detail below, the insert shoulder 76 ensures that the seat insert 64 does not substantially move in the axial direction 30. In addition, the seat ring 46 includes an annular inner surface 78 having a substantially constant diameter and along which the locking ring 70 may slide into the profiled groove 68 when installed in the seat ring 46. The first outer surface 72 and the inner surface 78 are connected via a groove base surface 80 that extends radially from the inner surface 78 to the first outer surface 72. Both the seat insert 64 and the locking ring 70 abut the groove base surface 80 when installed in the profiled groove 68.

FIG. 5 is a partial cross sectional side view of the locking ring 70 of FIG. 3, and FIG. 6 is a partial cross sectional side view of the seat insert 64 of FIG. 3. As illustrated in FIG. 6, the seat insert 64 includes an annular first outer wall 82 and an annular second outer wall 84 connected by an annular tapered section 86. More specifically, the first outer wall 82 has a first diameter (e.g., as measured from a center 88 of the annular seat insert 64) that is slightly larger than a second diameter of the second outer wall 84. As such, the tapered section 86 is configured to abut the insert shoulder 76 of the seat ring 46 when the seat insert 64 is snapped into the profiled groove 68 of the seat ring 64, as described above with respect to FIG. 4. More specifically, the first outer wall 82 of the seat insert 64 abuts the first outer surface 72 of the profiled groove 68 of the seat ring 46 of FIG. 4. In addition, the first outer wall 82 of the seat insert 64 is held in place against the first outer surface 72 of the profiled groove 68 at least in part to the fact that the tapered section 86 of the seat insert 64 and the insert shoulder 76 of the profiled groove 68 of the seat ring 46 prevent movement of the seat insert 64 in the axial direction 30. Rather, the tapered section 86 of the seat insert 64 and the insert shoulder 76 of the seat insert 64 ensure that a groove-abutting end 90 of the seat insert 64 remains in physical contact with the groove base surface 80 of the profiled groove 68 of the seat ring 46 when the seat insert 64 and the locking ring 70 are installed in the profiled groove 68.

As illustrated in FIG. 6, the seat insert 64 also includes an annular inner wall 92 having a substantially constant diameter, which is connected to a slightly curved ball-abutting end 94 that physically contacts the ball 36 when the ball valve 10 is assembled. More specifically, the curved ball-abutting ends 94 of the seat inserts 64 are the only points of physical contact between the seat rings 46 and the ball 36 when the ball 36 and the seat rings 46 are installed in the ball valve 10. Over time, the curved ball-abutting ends 94 may become slightly worn due to the friction between the ball 36 and the seat insert 64 when the ball 36 is rotated between closed and open positions. However, as described above, when the curved ball-abutting ends 94 become slightly worn, the seat inserts 64 may be machined out and replaced without the need to replace any of the other components of the seat rings 46.

As described above, the locking ring 70 is used to hold the seat insert 64 in place within the profiled groove 68 of the seat ring 46. As illustrated in FIG. 5, in certain embodiments, the locking ring 70 includes an annular first tapered (e.g., conical) outer wall 96 and an annular second tapered (e.g., conical) outer wall 98, each terminating at respective first and second corner 100, 102. More specifically, a first diameter (e.g., as measured from a center 104 of the annular locking ring 70) of the first tapered outer wall 96 gradually increases from a groove-abutting end 106 of the locking ring 70 to the first corner 100, and a second diameter of the second tapered outer wall 98 gradually increases from the first corner 100 to the second corner 102. It should be noted that while illustrated as having two tapered outer walls 96, 98 with two corners 100, 102, in other embodiments, any number of tapered outer walls and corners may be used with the locking ring 70. For example, in other embodiments, the locking ring 70 may include 3, 4, 5, or more tapered outer walls with corners. In addition, as illustrated in FIG. 5, the locking ring 70 includes an annular inner wall 108 having a substantially constant diameter, wherein the inner wall 108 generally abuts the substantially constant diameter inner surface 78 of the profiled groove 68 of the seat ring 46 when the locking ring 70 is installed in the profiled groove 68. As also illustrated in FIG. 5, in certain embodiments, the locking ring 70 may include one or more cuts 110 (e.g., axial slots) along the inner wall 108 that allow air to escape between the locking ring 70 and the seat ring 46 when pressing the locking ring 70 into the profiled groove 68.

Once the seat insert 64 has been inserted into the profiled groove 68, the locking ring 70 may be slid into the profiled groove 68 with the inner wall 108 of the locking ring 70 sliding along the inner surface 78 of the profiled groove 68. The locking ring 70 is inserted into the profiled groove 68 until the groove-abutting end 106 contacts the groove base surface 80. While the locking ring 70 is being inserted into the profiled groove 68, the first and second tapered outer walls 96, 98 may simply slide along the curved end 94 and the inner wall 92 of the seat insert 64 of FIG. 6, because the tapered outer walls 96, 98 and, more specifically, the first and second corners 100, 102 are angled such that they push against the curved end 94 and the inner wall 92. As a result, the outer walls 82 and 84 of the seat insert 64 are pressed against the outer surfaces 72 and 74 of the profiled groove 68 of the seat ring 46.

Conversely, however, once the locking ring 70 has been inserted into the profiled groove 68, the locking ring 70 is prevented from sliding out of the profiled groove 68 at least in part to the fact that the tapered outer walls 96, 98 and, more specifically, the first and second corners 100, 102 are angled into the inner wall 92 of the seat insert 64. In other words, the first and second corners 100, 102 of the locking ring 70 form teeth that act against and are slightly embedded into the inner wall 92 of the seat insert 64 to prevent movement of the locking ring 70 in the axial direction 30 once the locking ring 70 and the seat insert 64 are inserted into the profiled groove 68. As such, the locking ring 70 acts to constrain the seat insert 64 within the profiled groove 68 by creating forces in both the axial direction 30 and the radial direction 42 that cause the seat insert 64 to remain in place within the profiled groove 68 during operation of the ball valve 10.

Figure 7:
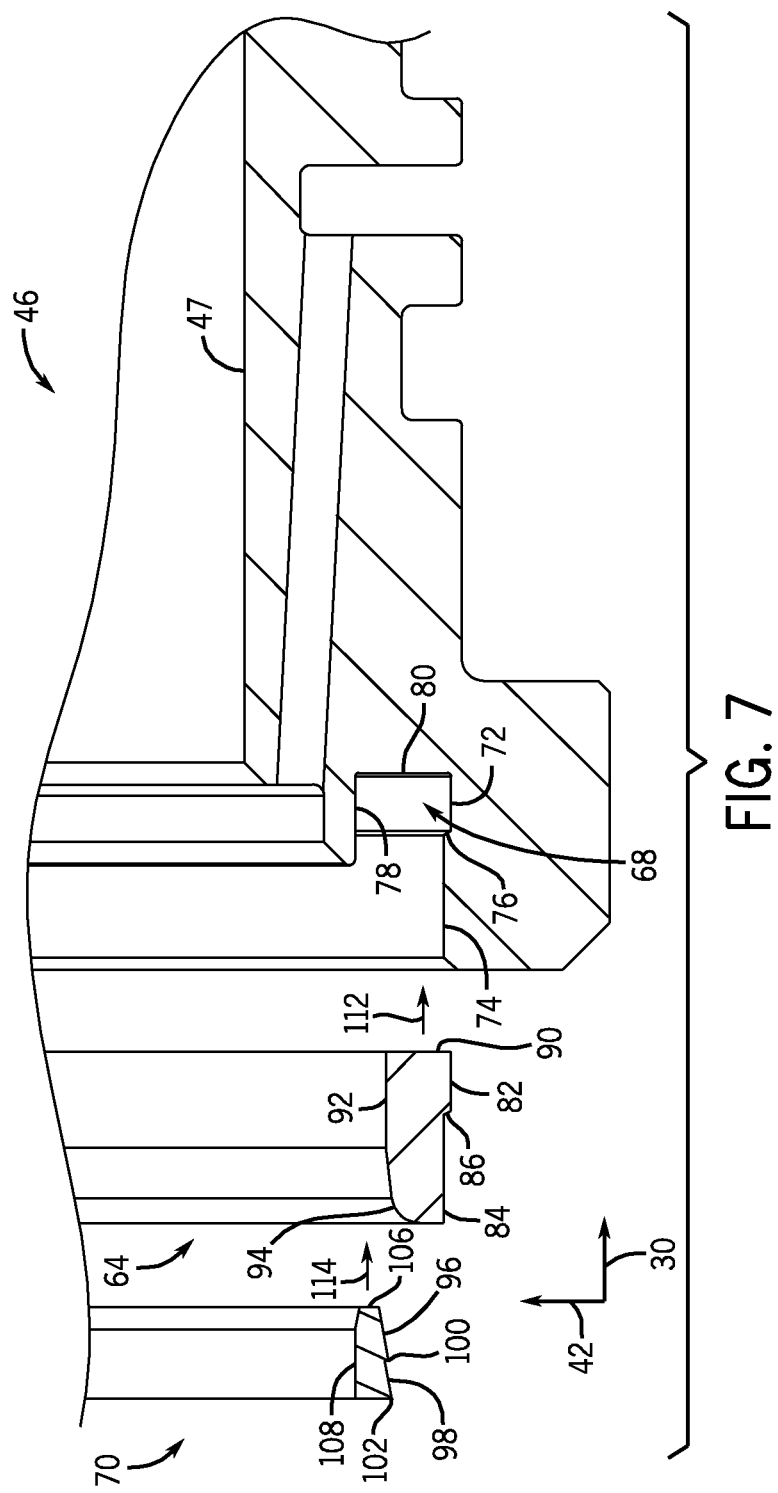
FIG. 7 is a partial cross sectional side view of the seat ring of FIG. 4, the seat insert of FIG. 5, and the locking ring of FIG. 6 assembled together.

FIG. 7 is a partial cross sectional side view of the seat ring 46 of FIG. 4, the seat insert 64 of FIG. 5, and the locking ring 70 of FIG. 6, illustrating how the seat ring 46, the seat insert 64, and the locking ring 70 are assembled together. As illustrated by arrow 112, the seat insert 64 may first be inserted into the profiled groove 68 of the seat ring 46. In particular, as described above, the seat insert 64 may first be snapped into the profiled groove 68 such that the insert shoulder 76 of the profiled groove 68 acts against the tapered section 86 of the seat insert 64, and the groove base surface 80 of the profiled groove 68 acts against the groove-abutting end 90 of the seat insert 64, to ensure that the seat insert 64 is substantially prevented from moving out of the profiled groove 68 along the axial direction 30.

Once the seat insert 64 has been inserted into the profiled groove 68 of the seat ring 46, the locking ring 70 may be inserted into the profiled groove 68, as illustrated by arrow 114, to help maintain the seat insert 64 in the profiled groove 68. More specifically, as described above, the locking ring 70 may slide into the profiled groove 68 of the seat ring 46 between the seat insert 64 and the inner surface 78 of the profiled groove 68. Insertion of the locking ring 70 into the profiled groove 68 may be at least partially facilitated by the fact that the first and second tapered outer walls 96, 98 and associated corners 100, 102 are angled away from the curved end 94 and the inner wall 92 of the seat insert 64. However, once inserted into the profiled groove 68, extraction of the locking ring 70 from the profiled groove 68 may be substantially prevented by the fact that the first and second tapered outer walls 96, 98 and associated corners 100, 102 are angled into the inner wall 92 of the seat insert 64 such that the corners 100, 102 of the locking ring 70 cut into the inner wall 92 of the seat insert 64.

As such, the locking ring 70 holds the seat insert 64 in the profiled groove 68, thereby substantially preventing movement of the seat insert 64 from the profiled groove 68 in both the axial direction 30 or the radial direction 42. If, over time, the curved end 94 of the seat insert 64 becomes worn due to frictional contact between the ball 36 of the ball valve 10, the plastic seat insert 64 may be machined out of the profiled groove 68, the locking ring 70 may be removed from the profiled groove 68, a new seat insert 64 may be inserted into the profiled groove 68, and the locking ring 70 may be re-inserted into the profiled groove 68. As such, the present embodiments enable the replacement of only the seat inserts 64 (i.e., the only components of the seat ring 46 that physically contact the ball 36 of the ball valve 10) instead of the replacement of the entire seat ring 46.

Figure 8:
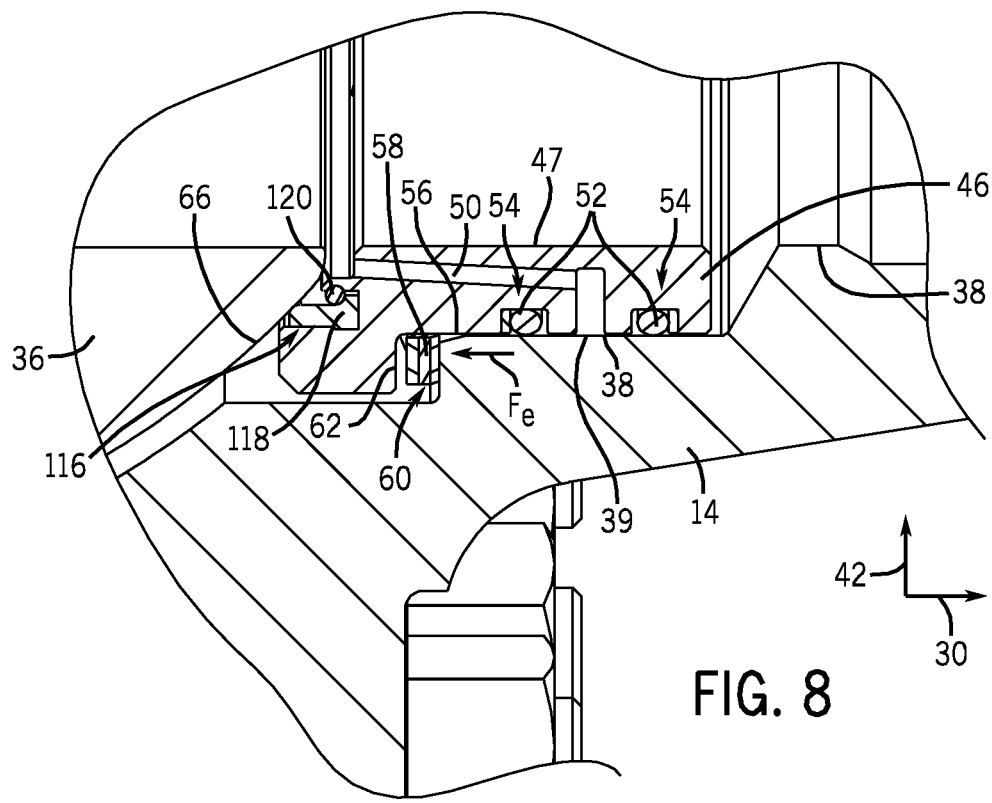
FIG. 8 is a partial cross sectional side view of an exemplary embodiment of the ball, the seat ring, and the adapter of FIG. 2.

The seat ring 46, seat insert 64, and locking ring 70 illustrated in FIGS. 3 through 7 are only one embodiment that may be used as described herein. Other types of the seat rings, seat inserts, and locking rings may be used to ensure that the seat insert remains locked in place within a profiled groove of the seat ring by the locking ring. For example, FIG. 8 is a partial cross sectional side view of an exemplary embodiment of the ball 36, the seat ring 46, and the adapter 14 of FIG. 2. The embodiment of FIG. 8 is similar to the embodiment illustrated in FIG. 3 described above. However, as described in FIGS. 9 through 12 below, the embodiment of FIG. 8 is slightly different. For example, the annular profiled groove 116 of the seat ring 46 of FIG. 8 is slightly different, as are the annular seat insert 118 and the annular locking ring 120. As described above, the seat ring 46 may generally be made from a metallic material, while the seat insert 118 may be made from a plastic material such that the physical contact between the ball 36 and the seat insert 118 slightly compresses the seat insert 118. Using a plastic seat insert 118 eliminates the metal-on-metal contact that would otherwise exist between the ball 36 and the seat insert 118, and provides the sealing effect of the seat ring 46 and ball 36.

The seat insert 118 is held in place within the profiled groove 116 by the locking ring 120 that also fits within the profiled groove 116. As described in greater detail below, as opposed to the embodiments described above with respect to FIGS. 3 through 7, the locking ring 120 of FIG. 8 is a round ring (e.g., a circular cross-section extending about the ring) made from a metallic material and configured to snap into a semi-circular groove in an inner surface of the profiled groove 116. When the locking ring 120 and the seat insert 118 are both inserted in the profiled groove 116, the locking ring 120 prevents the seat insert 118 from substantially moving in either the axial direction 30 or the radial direction 42. However, when a new seat insert 118 is needed (e.g., when the seat insert 118 becomes slightly worn with age), the plastic seat insert 118 may simply be machined out, the locking ring 120 may be removed from the profiled groove 116, a new plastic insert 118 may be inserted into the profiled groove 116, and the locking ring 120 may be re-inserted into the profiled groove 116, thereby holding the new plastic insert 118 in place. In other words, instead of replacing the entire seat ring 46 due to wear that occurs between the ball 36 and the seat ring 46, the present embodiments enable replacement of only the plastic seat insert 118.

Figure 9:
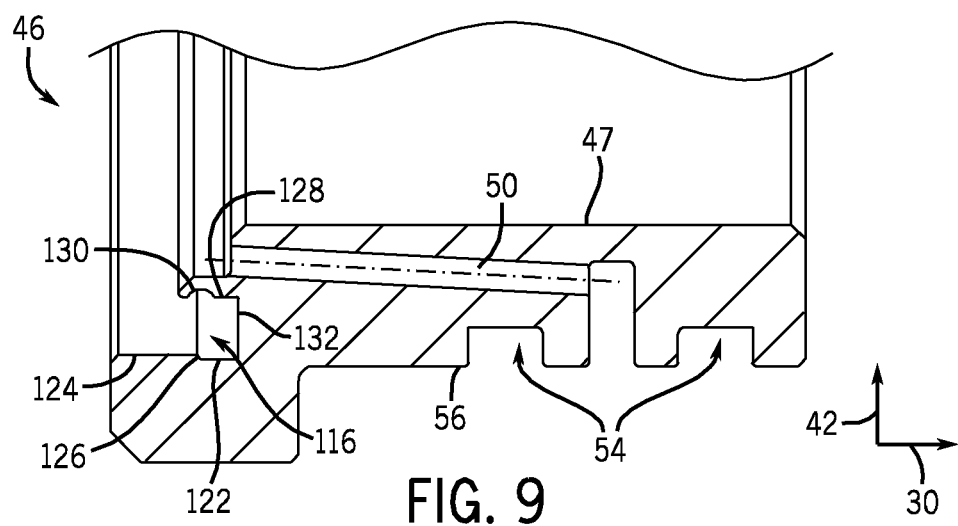
FIG. 9 is a partial cross sectional side view of the seat ring of FIG. 8.

FIG. 9 is a partial cross sectional side view of the seat ring 46 of FIG. 8. As illustrated, the seat ring 46 includes the profiled groove 116 that has a plurality of surfaces that help retain the seat insert 118 and the locking ring 120 in place. In particular, the profiled groove 116 includes an annular first outer surface 122 and an annular second outer surface 124 connected by an annular insert shoulder 126. More specifically, the first outer surface 122 has a first diameter (e.g., as measured from a center of the annular seat ring 46) that is slightly larger than a second diameter of the second outer surface 124. As such, the insert shoulder 126 is configured to hold the seat insert 118 within the profiled groove 116 when the seat insert 118 and the locking ring 120 are installed within the profiled groove 116. More specifically, the insert shoulder 126 ensures that the seat insert 118 does not substantially move in the axial direction 30. In addition, the seat ring 46 includes an annular inner surface 128 having an annular semi-circular groove 130 into which the locking ring 120 may snapped. The first outer surface 122 and the inner surface 128 are connected via a groove base surface 132 that extends radially from the inner surface 128 to the first outer surface 122. Both the seat insert 118 and the locking ring 120 abut the groove base surface 132 when installed in the profiled groove 116.

Figure 10:
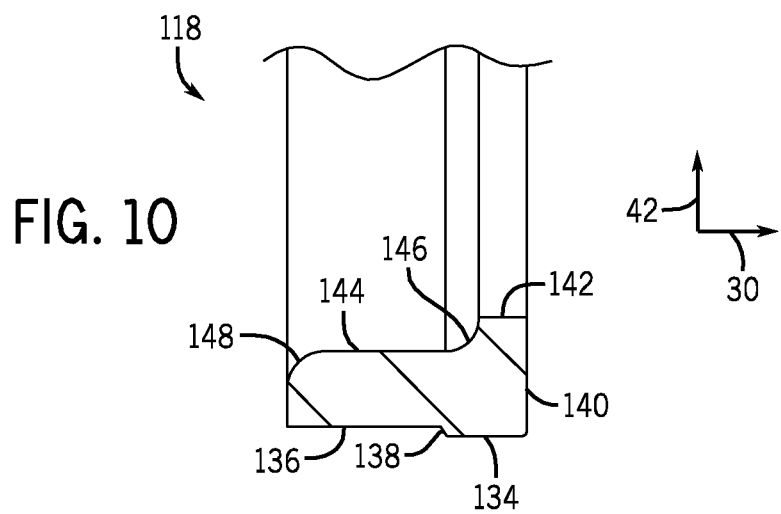
FIG. 10 is a partial cross sectional side view of the seat insert of FIG. 8.
Figure 11:
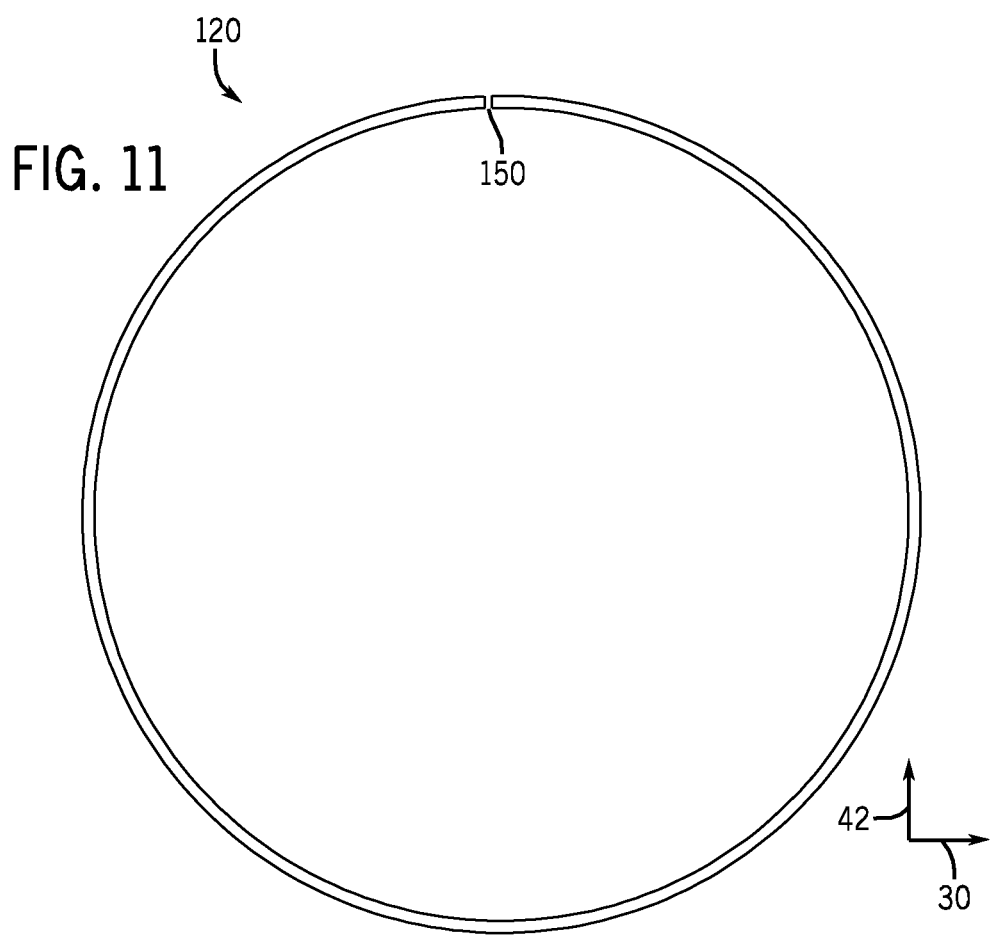
FIG. 11 is an axial side view of the locking ring of FIG. 8.

FIG. 10 is a partial cross sectional side view of the seat insert 118 of FIG. 8, and FIG. 11 is an axial side view of the locking ring 120 of FIG. 8. As illustrated in FIG. 10, the seat insert 118 includes an annular first outer wall 134 and an annular second outer wall 136 connected by an annular tapered section 138. More specifically, the first outer wall 134 has a first diameter (e.g., as measured from a center of the annular seat insert 118) that is slightly larger than a second diameter of the second outer wall 136. As such, the tapered section 138 is configured to abut the insert shoulder 126 of the seat ring 46 when the seat insert 118 is installed in the profiled groove 116 of the seat ring 46, as described above with respect to FIG. 9. More specifically, the first outer wall 134 of the seat insert 118 abuts the first outer surface 122 of the profiled groove 116 of the seat ring 46 of FIG. 9. In addition, the first outer wall 134 of the seat insert 118 is held in place against the first outer surface 122 of the profiled groove 116 at least in part by the fact that the tapered section 138 of the seat insert 118 and the insert shoulder 126 of the profiled groove 116 of the seat ring 46 prevent movement of the seat insert 118 in the axial direction 30. Rather, the tapered section 138 of the seat insert 118 and the insert shoulder 126 of the profiled groove 116 of the seat ring 46 ensure that a groove-abutting end 140 of the seat insert 118 remains in physical contact with the groove base surface 132 of the profiled groove 116 of the seat ring 46 when the seat insert 118 and the locking ring 120 are installed in the profiled groove 116.

As illustrated in FIG. 10, the seat insert 118 also includes an annular first inner wall 142 and an annular second inner wall 144, both having a substantially constant diameter. However, the seat insert 118 also includes an annular rounded section 146 that connects the first and second inner walls 142, 144, and a slightly curved ball-abutting end 148 that physically contacts the ball 36 when the ball valve 10 is assembled. More specifically, the curved ball-abutting ends 148 of the seat inserts 118 are the only points of physical contact between the seat rings 46 and the ball 36 when the ball 36 and the seat rings 46 are installed in the ball valve 10. Over time, the curved ball-abutting ends 148 may become slightly worn due to the friction between the ball 36 and the seat insert 118 when the ball 36 is rotated between closed and open positions. However, as described above, when the curved ball-abutting ends 148 become slightly worn, the seat insert 118 may be machined out and replaced without the need to replace any of the other components of the seat rings 46.

As described above, the locking ring 120 is used to hold the seat insert 118 in place within the profiled groove 116 of the seat ring 46. As illustrated in FIG. 11, in certain embodiments, the locking ring 120 is a nearly continuous round annular ring having a cut and a gap 150 that enables the locking ring 120 to be slightly expanded (e.g., deformed circumferentially) when snapped into the profiled groove 116. Once the seat insert 118 has been inserted into the profiled groove 116, the locking ring 120 may be snapped into the space between the semi-circular groove 130 in the inner surface 128 of the profiled groove 116 and the rounded section 146 of the seat insert 118. Once the locking ring 120 has been inserted into the profiled groove 116, the locking ring 120 is prevented from sliding out of the semi-circular groove 130 in the inner surface 128 of the profiled groove 116. As such, the locking ring 120 acts to constrain the seat insert 118 within the profiled groove 116 by creating forces in both the axial direction 30 and the radial direction 42 that cause the seat insert 118 to remain in place within the profiled groove 116 during operation of the ball valve 10.

Figure 12:
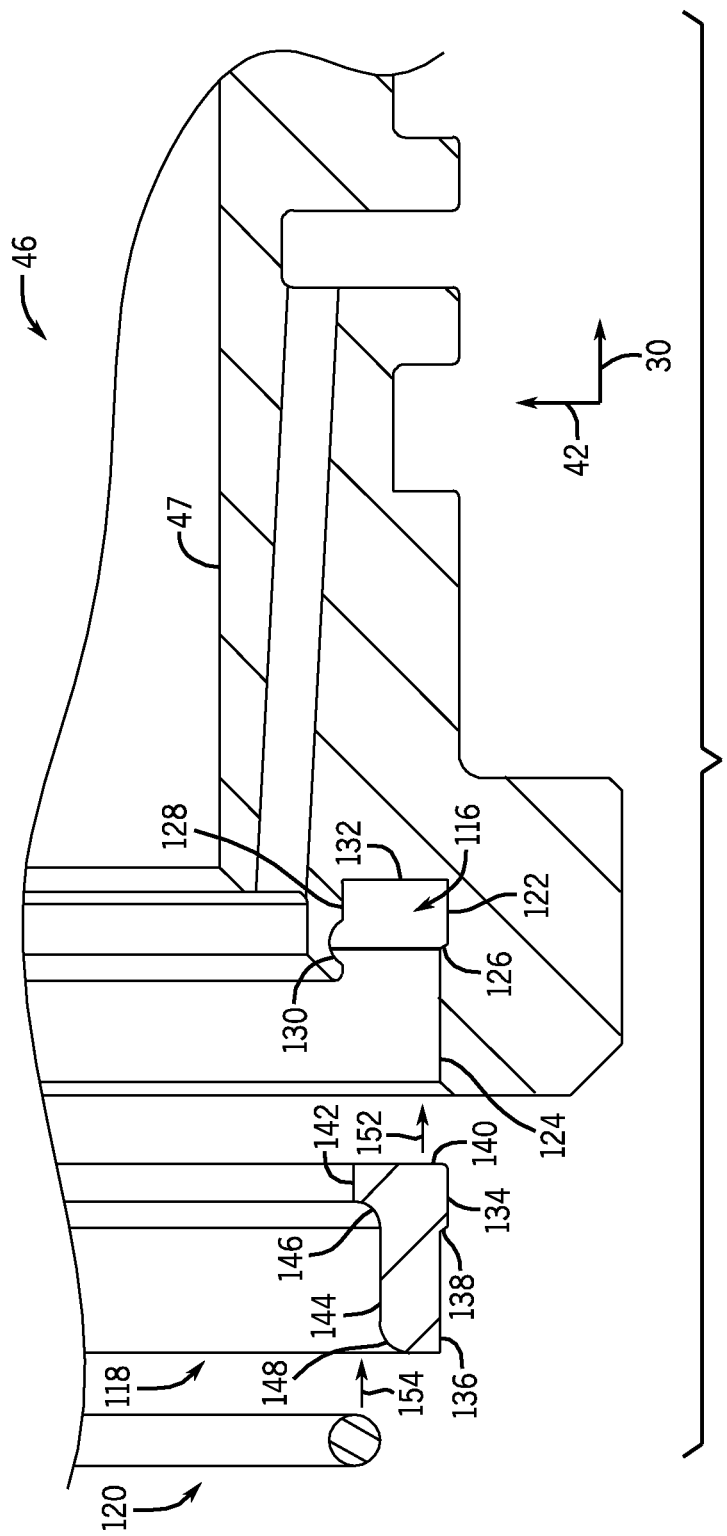
FIG. 12 is a partial cross sectional side view of the seat ring of FIG. 9, the seat insert of FIG. 10, and the locking ring of FIG. 11 assembled together.

FIG. 12 is a partial cross sectional side view of the seat ring 46 of FIG. 9, the seat insert 118 of FIG. 10, and the locking ring 120 of FIG. 11, illustrating how the seat ring 46, the seat insert 118, and the locking ring 120 are assembled together. As illustrated by arrow 152, the seat insert 118 may first be inserted into the profiled groove 116 of the seat ring 46. In particular, as described above, the seat insert 118 may first be snapped into the profiled groove 116 such that the insert shoulder 126 of the profiled groove 116 acts against the tapered section 138 of the seat insert 118, and the groove base surface 132 of the profiled groove 116 abuts the groove-abutting end 140 of the seat insert 118, to ensure that the seat insert 118 is substantially prevented from moving out of the profiled groove 116 along the axial direction 30.

Once the seat insert 118 has been inserted into the profiled groove 116 of the seat ring 46, the locking ring 120 may be snapped into the semi-circular groove 130 in the inner surface 128 of the profiled groove 116, as illustrated by arrow 154, to help maintain the seat insert 118 in the profiled groove 116. More specifically, the locking ring 120 holds the seat insert 118 in the profiled groove 116, thereby substantially preventing movement of the seat insert 118 from the profiled groove 116 in either the axial direction 30 or the radial direction 42. If, over time, the curved end 148 of the seat insert 118 becomes worn due to frictional contact between the ball 36 of the ball valve 10, the plastic seat insert 118 may be machined out of the profiled groove 116, the locking ring 120 may be removed from the profiled groove 116, a new seat insert 118 may be inserted into the profiled groove 116, and the locking ring 120 may be re-inserted into the profiled groove 116. As such, the present embodiments enable the replacement of only the seat inserts 118 (i.e., the only components of the seat ring 46 that physically contact the ball 36 of the ball valve 10) instead of the replacement of the entire seat ring 46.

An advantage of the disclosed embodiments is that the seat inserts 64, 118 may be installed in the ball valve 10 and machined out of the ball valve 10 without the need to deform the seat rings 46 (e.g., by rolling a lip of the seat rings 46 into the seat inserts 64, 118). In addition, the techniques described herein for retaining the seat inserts 64, 118 in the seat rings 46 minimize deformation of the seat inserts 64, 118. More specifically, the seat inserts 64, 118 retain their intended shape due to the fact that the locking rings 70, 120 impart substantially lower compressive forces onto the seat inserts 64, 118 as opposed to conventional techniques. As such, the embodiments described herein do not require secondary machining (e.g., of the seat inserts 64, 118) after assembly. In addition, the metallic seat rings 46 and the metallic locking rings 70, 120 do not sustain any plastic deformation during the assembly and disassembly processes. As such, the seat rings 46 and the locking rings 70, 120 have a substantially longer service life as compared to conventional techniques. Furthermore, as described above, the processes of inserting new seat inserts 64, 118 and machining out old seat inserts 64, 118 when they become worn can be repeated as desired, without substantial damage to the seat rings 46 or the locking rings 70, 120.

Another advantage of the disclosed embodiments is that the seat rings 46, seat inserts 64, 118, and locking rings 70, 120 can be used with existing ball valves 10 and their component parts (e.g., the bodies 12, the adapters 14, and the balls 36). In other words, the seat rings 46, seat inserts 64, 118, and locking rings 70, 120 described herein may be used as retrofit kits for existing ball valves 10. In addition, the seat rings 46 described herein may be adapted to work as self-relieving pressure seats or as double piston effect seats, without substantial change to the profiled grooves 68, 116 of the seat rings 46. In other words, without substantial changes to the profiled grooves 68, 116 of the seat rings 46, the seat inserts 64, 118 and the locking rings 70, 120 may be designed such that the seat rings 46 function as self-relieving pressure seats or as double piston effect seats.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a valve seat assembly, comprising:
a seat ring having an annular groove disposed about a central axis;
a seat insert having a first substantially axial path of insertion along the central axis into the annular groove of the seat ring; and
a locking ring comprising one or more teeth having a second substantially axial path of insertion without requiring rotation along the central axis into the annular groove of the seat ring between the seat insert and the seat ring, wherein the locking ring having the one or more teeth is configured to resist axial and radial movement of the seat insert and the locking ring with respect to the annular groove when inserted into the annular groove, wherein the seat ring extends around opposite sides of the seat insert and the locking ring when inserted into the annular groove, wherein the valve seat assembly is configured to removably mount in a housing of a valve.

2. The system of claim 1, wherein the seat insert and the locking ring each extend in an axial direction along the central axis to a common depth inside the annular groove.

3. The system of claim 1, wherein the seat insert and the locking ring each extend in an axial direction along the central axis to an axial end inside the annular groove.

4. The system of claim 1, wherein the locking ring extends only between first and second axial ends of the seat insert.

5. The system of claim 1, wherein the seat insert comprises opposite first and second axial ends and opposite first and second side walls, the first axial end faces an axial end inside the annular groove, the seat insert comprises a gradual turn from the second axial end to the first side wall, and the first side wall faces a radially opposite side wall of the locking ring.

6. The system of claim 1, wherein the one or more teeth comprise one or more tapered portions.

7. The system of claim 6, wherein the locking ring has a leading end and a trailing end, the locking ring is configured to be inserted in the axial direction into the annular groove of the seat ring beginning with the leading end, and the one or more tapered portions each taper in a direction away from the leading end and extend to a respective corner.

8. The system of claim 1, wherein the one or more teeth comprise a plurality of teeth at different axial positions.

9. The system of claim 1, wherein the one or more teeth are configured to engage with a radially opposite surface of the seat insert.

10. The system of claim 1, wherein the seat insert has an abutment portion between opposite first and second axial ends of the seat insert, and the abutment portion axially abuts against a shoulder in the annular groove between opposite third and fourth axial ends of the annular groove.

11. The system of claim 1, wherein the one or more teeth do not engage with mating teeth.

12. The system of claim 1, wherein the locking ring has a first axial length that is less than a second axial length of the seat insert.

13. The system of claim 1, wherein the locking ring is configured to be spaced away from the valve while the seat insert contacts the valve.

14. The system of claim 1, wherein the seat insert comprises a plastic seat insert, the locking ring comprises a metallic locking ring, and the seat ring comprises a metallic seat ring.

15. The system of claim 1, comprising the valve having the valve seat assembly.

16. The system of claim 15, wherein the valve comprises a ball valve.

17. A system, comprising:
a ball valve having a ball disposed in a body, wherein the ball is configured to move between an open position and a closed position along a fluid passage;

a valve seat assembly, comprising:
  a seat ring having an annular groove;
  a seat insert disposed in the annular groove of the seat ring, wherein the seat insert contacts the ball; and
  a locking ring disposed in the annular groove of the seat ring between the seat insert and the seat ring, wherein the locking ring comprises one or more teeth having a path of insertion in a substantially linear direction without requiring rotation from an entry position to an inserted position in the annular groove, wherein the one or more teeth resist movement of the seat insert and the locking ring after insertion of the locking ring into the annular groove to the inserted position, wherein the seat ring extends around opposite sides of the seat insert and the locking ring after insertion into the annular groove.

18. The system of claim 17, wherein the seat ring is disposed about a central axis, the seat insert is configured to be inserted in the substantially linear direction along the central axis into the annular groove of the seat ring, and the locking ring is configured to be inserted in the substantially linear direction along the central axis into the annular groove of the seat ring between the seat insert and the seat ring.

19. The system of claim 17, wherein the one or more teeth comprise a plurality of teeth contacting a radially opposite surface of the seat insert when the locking ring is disposed in the inserted position.

20. A method, comprising:
  applying a first axial force to insert a seat insert in an axial direction relative to a central axis of a seat ring into an annular groove of the seat ring; and
  applying a second axial force to insert a locking ring having one or more teeth in the axial direction without requiring rotation from an entry position to an inserted position into the annular groove of the seat ring between the seat insert and the seat ring to hold together the seat insert, the locking ring, and the seat ring as a valve seat assembly, wherein the locking ring resists axial and radial movement of the seat insert and the locking ring with respect to the annular groove when the locking ring is inserted into the annular groove to the inserted position, wherein the seat ring extends around opposite sides of the seat insert and the locking ring when inserted into the annular groove, wherein the valve seat assembly is configured to removably mount in a housing of a valve.

* * * * *